United States Patent
Nelson et al.

(10) Patent No.: US 7,424,786 B1
(45) Date of Patent: Sep. 16, 2008

(54) FISHING LURE HAVING TWO OR MORE HOOKS

(76) Inventors: Bruce Carl Nelson, 2651 Fairlawn Dr., Stillwater, MN (US) 55082; Joshua Roy Nelson, 2651 Fairlawn Dr., Stillwater, MN (US) 55082

(*) Notice: Subject to any disclaimer, the term of this patent is extended or adjusted under 35 U.S.C. 154(b) by 0 days.

(21) Appl. No.: 11/698,824

(22) Filed: Jan. 29, 2007

(51) Int. Cl.
*A01K 83/00* (2006.01)
(52) U.S. Cl. ............... 43/44.82; 43/43.16; 43/44.81; 43/42.39
(58) Field of Classification Search ............. 43/44.82, 43/43.16, 44.2, 44.4, 44.6, 44.8, 44.81, 42.39, 43/42.82, 42.37, 42.7
See application file for complete search history.

(56) References Cited

U.S. PATENT DOCUMENTS

| | | | | |
|---|---|---|---|---|
| 497,962 A * | 5/1893 | D'Ivernois | .............. | 43/44.81 |
| 590,401 A * | 9/1897 | Morgan | .............. | 43/44.6 |
| 605,538 A * | 6/1898 | Dempsey | .............. | 43/44.2 |
| 754,349 A * | 3/1904 | Scott | .............. | 43/44.6 |
| 787,806 A * | 4/1905 | Torgerson | .............. | 43/42.7 |
| 814,624 A * | 3/1906 | Robinson | .............. | 43/36 |
| 1,251,810 A * | 1/1918 | Oehler | .............. | 43/42.74 |
| 1,357,678 A * | 11/1920 | Bain | .............. | 43/44.82 |
| 1,556,228 A * | 10/1925 | Lewis | .............. | 294/16 |
| 1,619,147 A * | 3/1927 | Mathey | .............. | 43/44.8 |
| 1,745,169 A * | 1/1930 | Johnson | .............. | 43/44.6 |
| 1,911,778 A * | 5/1933 | Toolan | .............. | 43/44.82 |
| 2,010,598 A * | 8/1935 | Leighton | .............. | 43/44.6 |
| 2,051,651 A * | 8/1936 | Pachner et al. | .............. | 43/44.8 |
| 2,074,540 A * | 3/1937 | Dorsey | .............. | 43/44.6 |
| 2,148,074 A * | 2/1939 | Kaspick | .............. | 43/44.8 |
| 2,206,321 A * | 7/1940 | Hovey | .............. | 43/44.2 |
| 2,257,403 A * | 9/1941 | Vandine | .............. | 43/44.6 |
| 2,402,730 A * | 6/1946 | Bucks | .............. | 43/44.4 |
| 2,514,527 A * | 7/1950 | Verhota | .............. | 43/44.82 |
| 2,534,469 A * | 12/1950 | Moore | .............. | 43/44.82 |
| 2,589,007 A * | 3/1952 | Landon | .............. | 43/42.39 |
| 2,592,664 A * | 4/1952 | De Mello | .............. | 43/44.82 |
| 2,593,220 A * | 4/1952 | Thompson et al. | .............. | 43/44.83 |
| 2,645,054 A * | 7/1953 | Taylor | .............. | 43/44.2 |
| 2,663,966 A * | 12/1953 | Demello | .............. | 43/44.82 |
| 2,680,321 A * | 6/1954 | Premo | .............. | 43/44.82 |

(Continued)

FOREIGN PATENT DOCUMENTS

DE          3307604 A1 *   9/1984

(Continued)

*Primary Examiner*—Darren W Ark
(74) *Attorney, Agent, or Firm*—Thomas B. Tate

(57) ABSTRACT

The fishing lure having two or more hooks is constructed in an upside-down "T" formation that, in its simplest form, incorporates two hooks at one hundred eighty degrees from each other and a shank that is located between the hooks and is perpendicular to a shaft that connects the hooks. The shank has a loop, ring, or bend at the top where the fishing line is attached. The hook can be manufactured as either a two piece unit or as a one piece unit. The unit is produced with or without a weight and/or bead located at the junction of the "T". The hooks and the weight and/or bead will vary in size as required for the application in which it is used. The hook shafts may vary in length to accommodate a variety of baiting options and presentation styles. The weight, bead, and hooks come in a variety of shapes, sizes, colors, and finishes.

1 Claim, 2 Drawing Sheets

U.S. PATENT DOCUMENTS

| | | | | |
|---|---|---|---|---|
| 2,733,539 A | * | 2/1956 | Kelly | 43/44.82 |
| 2,749,652 A | * | 6/1956 | Slane | 43/44.82 |
| 2,781,605 A | * | 2/1957 | Eilermann | 43/44.2 |
| 2,782,551 A | * | 2/1957 | Raymond | 43/44.82 |
| 2,808,678 A | * | 10/1957 | Leonardi | 43/44.82 |
| 2,870,563 A | * | 1/1959 | Rose | 43/43.16 |
| 2,874,510 A | * | 2/1959 | Fitzgerald | 43/44.81 |
| 2,882,639 A | * | 4/1959 | McGarraghy et al. | 43/44.2 |
| 2,948,079 A | * | 8/1960 | Malchert | 43/44.81 |
| 2,984,929 A | * | 5/1961 | Kwisnek | 43/44.6 |
| 2,998,669 A | * | 9/1961 | Shook | 43/44.81 |
| 3,000,131 A | * | 9/1961 | Stinson | 43/44.8 |
| 3,002,310 A | * | 10/1961 | Ferguson | 43/44.82 |
| 3,027,677 A | * | 4/1962 | Low | 43/44.82 |
| 3,046,691 A | * | 7/1962 | Courtright | 43/44.8 |
| 3,060,619 A | * | 10/1962 | Cornick | 43/42.39 |
| 3,105,319 A | * | 10/1963 | Whalen | 43/44.8 |
| 3,500,576 A | * | 3/1970 | Ostrom | 43/44.81 |
| 3,600,838 A | * | 8/1971 | Bablick | 43/44.8 |
| 3,680,246 A | * | 8/1972 | Florek | 43/44.2 |
| 3,778,921 A | * | 12/1973 | Peterson | 43/44.8 |
| 4,123,870 A | * | 11/1978 | Wiskirchen | 43/42.39 |
| 4,188,744 A | * | 2/1980 | Tochtrop | 43/44.82 |
| 4,280,296 A | * | 7/1981 | Volenec | 43/44.81 |
| 4,471,558 A | * | 9/1984 | Garcia | 43/44.8 |
| 4,506,470 A | * | 3/1985 | Adams | 43/44.82 |
| 4,530,180 A | * | 7/1985 | Gwaldacz et al. | 43/44.81 |
| 4,688,347 A | * | 8/1987 | Krogmann | 43/44.8 |
| 4,738,048 A | * | 4/1988 | Junkas | 43/44.2 |
| 4,910,907 A | * | 3/1990 | Schlaegel | 43/44.6 |
| 4,965,957 A | * | 10/1990 | Hnizdor | 43/44.82 |
| 5,182,876 A | * | 2/1993 | Lewis | 43/42.39 |
| 5,222,321 A | * | 6/1993 | Lu | 43/44.81 |
| 5,265,370 A | * | 11/1993 | Wold | 43/44.82 |
| 5,337,509 A | * | 8/1994 | Harold | 43/42.74 |
| 5,537,775 A | * | 7/1996 | Crumrine | 43/42.39 |
| 5,579,600 A | * | 12/1996 | Burns | 43/43.16 |
| 5,673,508 A | * | 10/1997 | Snyder | 43/42.37 |
| 5,901,493 A | * | 5/1999 | Tolliver | 43/44.82 |
| 6,430,866 B1 | * | 8/2002 | Chiaro | 43/43.16 |
| 2006/0196105 A1 | * | 9/2006 | Michlitsch | 43/44.82 |
| 2006/0213111 A1 | * | 9/2006 | Mitchell | 43/44.82 |

FOREIGN PATENT DOCUMENTS

| | | | | |
|---|---|---|---|---|
| DE | 10230048 A1 | * | 1/2003 | |
| EP | 127567 A1 | * | 12/1984 | |
| JP | 08116828 A | * | 5/1996 | |
| JP | 08140530 A | * | 6/1996 | |
| JP | 2000342111 A | * | 12/2000 | |
| JP | 2001069874 A | * | 3/2001 | |
| JP | 2001299147 A | * | 10/2001 | |
| JP | 2003116411 A | * | 4/2003 | |
| JP | 2003180200 A | * | 7/2003 | |
| JP | 2004065235 A | * | 3/2004 | |
| JP | 2004267212 A | * | 9/2004 | |
| JP | 2006223199 A | * | 8/2006 | |
| JP | 2007028946 A | * | 2/2007 | |
| WO | WO 9965296 A1 | * | 12/1999 | |

* cited by examiner section "5-5"

section "6-6"

FISHING LURE HAVING TWO OR MORE HOOKS

BACKGROUND OF THE INVENTION

The field of the invention is fishing lures, specifically fishing lures having more than one hook.

Many lures, in a variety of sizes and colors, are currently on the market, as it is well-known that different species of fish are attracted to different types of lures. Because some species of fish are known to be attracted to more than one type of bait but a fisherman has no way of knowing which of these preferred baits an individual fish will be attracted to on any given day, the fisherman's chances of catching fish are increased if he can fish with more than one hook simultaneously, each of the hooks having a different bait. However, in some states this method of fishing is legal only if the multiple hooks are part of a lure.

A few lures known in the prior art have more than one hook. Examples of this are twin hooks that can be slid onto a lure, and treble hooks that have three hooks projecting from a common shank. Double hooks, which have both hooks extending from a common shank and which primarily come in large sizes, can be attached to existing lures. In all of these prior art arrangements, the hooks project from the bottom of the lure. No known prior art has the hooks so configured as in the present invention, which has a hook at each end of the lure, positioned one hundred eighty degrees apart from each other, or multiples at each end in the same configuration.

SUMMARY OF THE INVENTION

The invention is a fishing lure having a generally upside-down "T" formation with one or more hooks at each end at an approximately one hundred eighty degree angle to each other.

The primary object of the invention is to provide a lure that increases the fisherman's baiting options and thus his opportunity to catch more fish, by using multiple baiting options presented in a natural way. For example, if he is fishing for a species that is known to be attracted to both minnow heads and wax grubs, he can bait one of the hooks with a minnow head and the other hook with a wax grub. A major advantage of having multiple hooks positioned one hundred eighty degrees apart, rather than clustered beneath the lure as in the prior art, is that the arrangement in the present invention allows the fisherman to present a natural appearance of the bait to the fish. For example, a minnow head looks like a live minnow swimming in the water. Because the movement of lure mimics live bait, fish are more likely to be fooled and to take the bait.

DETAILED DESCRIPTION OF THE INVENTION

Figure 1:
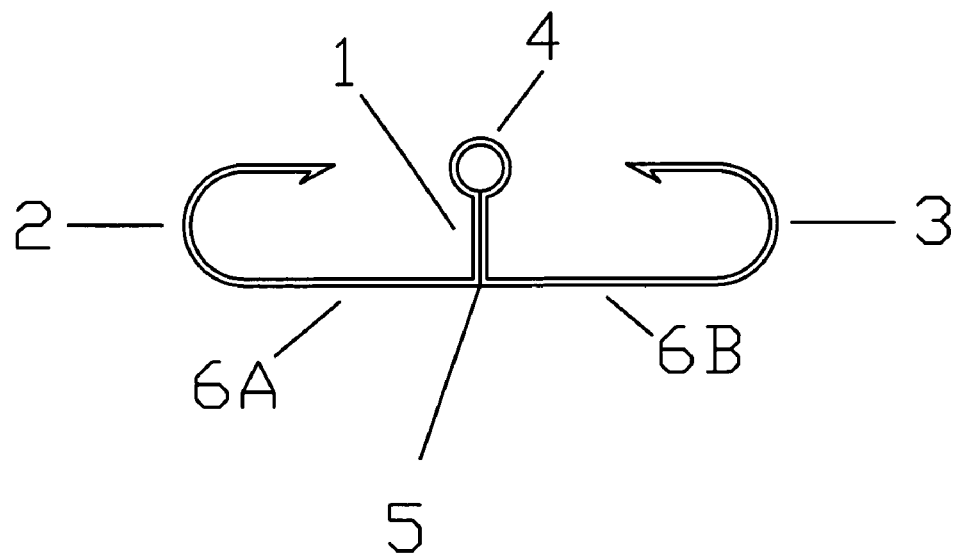
FIG. 1 is a side view of the embodiment of the invention without a weight or bead, wherein the lure is a unitary structure.

As seen from the side, the lure has a hook 2 at the left end and another hook 3 at the right end, one hundred eighty degrees opposite from each other. Hooks 2 and 3 are preferably made of metal and can be of any size, shape, or color. The example shown is a common type known as an Aberdeen hook, but other shapes work equally well. Treble hooks or other multiple hook arrangements can be used as an alternative to the single hook at either or both ends. Shafts 6A and 6B connect hook 2 to hook 3. The length of shafts 6A and 6B can vary in relationship to the size of the bait used, in order to balance weight so that the lure remains level in the water. A shank 1 extends generally perpendicularly from the junction of shafts 6A and 6B and is positioned approximately halfway between hook 2 and hook 3. At the top end of shank 1 a loop, bend, or ring 4 is formed in order to allow a conventional fishing line (not shown) to pass therethrough and be tied to the lure. A weight 8 and/or a bead 7 may be provided as an optional feature, said bead 7 or weight 8 being positioned at the junction 5 between shafts 6A and 6B. The weight 8 or bead 7 may be any size, shape, or color, and may be of any material conventionally used for weights (lead, bismuth, ceramic, or other heavy material) or beads (most commonly plastic, sometimes foam).

Figure 4:
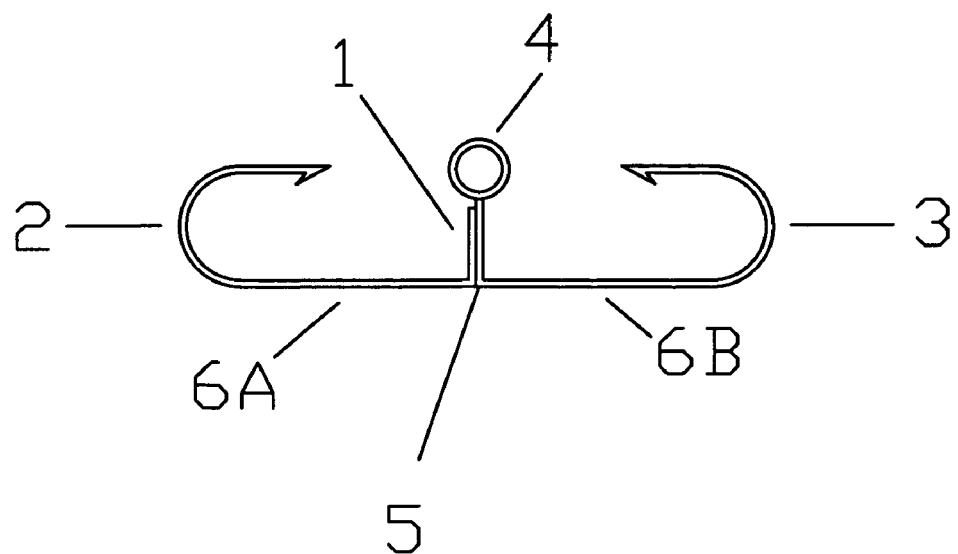
FIG. 4 is a side view of the embodiment without a weight or bead, wherein the lure is formed from two hooks joined together.
Figure 2:
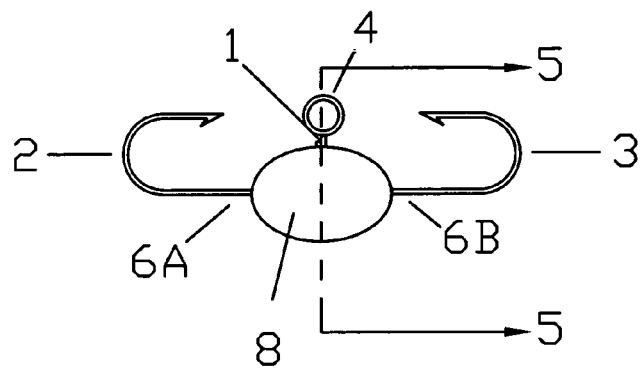
FIG. 2 is a side view of the embodiment with a weight.
Figure 5:
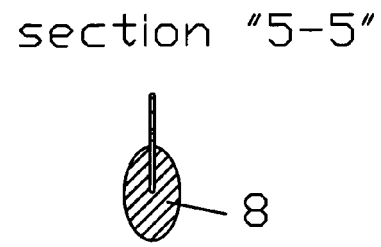
FIG. 5 is a sectional view of the embodiment with a weight, taken along line 5-5 of FIG. 2.
Figure 3:
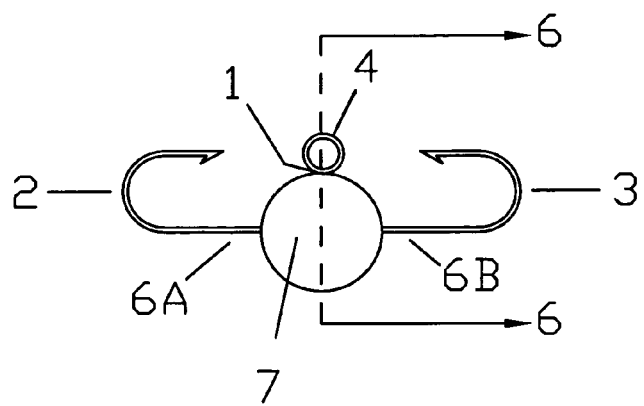
FIG. 3 is a side view of the embodiment with a bead.
Figure 6:
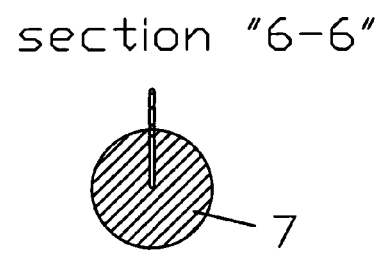
FIG. 6 is a sectional view of the embodiment with a bead, taken along line 6-6 of FIG. 3.

The preferred embodiment of the version without a weight or bead is a unitary structure wherein the hooks 2 and 3, shafts 6A and 6B, shank 1, and loop 4 are all a single piece formed from a mold. Alternatively, two hooks could be joined together at the junction between shaft 6A and shaft 6B, by for example, welding, soldering, or chemically joining as shown in FIG. 4. The embodiment of FIG. 4 includes the shank 1 being formed by the shanks of each of the hooks 2 and 3 which extend parallel to each other and are joined together in abutting relation along the lengths of the shanks. The hook 3 has a loop 4 on an upper end of its shank and the hook 2 has an upper end of its shank which terminates below the loop 4. The shafts 6A and 6B of the hooks 2 and 3 extend outward from the shank 1 in the same horizontal plane which is perpendicular to the shank 1. The shafts 6A and 6B extend toward curved portions 6D and 6E which transition to straight portions 6F and 6G that terminate at hook points 6H and 6I. The straight portions 6F and 6G and hook points 6H and 6I extend in a common horizontal plane which is parallel to the shafts 6A And 6B, perpendicular to the shank 1, and intersects the loop. In the version having a weight 8, a conventional method of pouring lead around the two molded hooks to close the mold can be used, and similarly, the version having a bead 7 can be made by adding the bead by injection molding.

To use the invention, the fisherman, who has selected the particular model (size, shape, color, finish, etc.) of this lure to use based upon the species and/or size of fish, size and/or type of bait, weather conditions, depth and/or current in the body of water to be fished, and other variables well-known to those skilled in the art, baits hooks 2 and 3 (usually with a different type of bait on each hook) and drops the lure into the water in the usual manner.

The foregoing examples of various embodiments of the invention given herein are provided as illustration of the best mode for carrying out the invention and not by way of limitation, the scope of the invention being limited only by the claims.

We claim:

1. A generally upside-down-T-shaped fishing lure comprising:

two hooks comprising:

one hook of said two hooks having a shank with top and bottom ends, a shaft with first and second ends, a curved portion, and a straight portion terminating in a hook point;

an other hook of said two hooks having a shank with top and bottom ends, a shaft with first and second ends, a curved portion, and a straight portion terminating in a hook point; and wherein the shanks of said two hooks being joined together in abutting relation along lengths of said shanks such that the shanks are parallel to each other, said top end of said one hook comprising a loop for attaching a fishing line and said top end of said other hook terminates below said loop, said first ends of said shafts attached to respective said bottom ends of said shanks and said shafts extending outwardly to said seconds ends thereof in a horizontal plane which is perpendicular to respective said shanks, the second ends of said shafts being attached to respective said curved portions, and said straight portions and said hook points extending in a common horizontal plane which is parallel to said horizontal plane in which said shafts extend, is perpendicular to said shanks, and intersects said loop.

* * * * *